(12) United States Patent
Hung et al.

(10) Patent No.: US 9,976,853 B2
(45) Date of Patent: May 22, 2018

(54) MOVABLE DEVICES

(71) Applicant: MSI COMPUTER (SHENZHEN) CO., LTD., Shenzhen, Guangdong Prov. (CN)

(72) Inventors: Shih-Che Hung, Hsinchu (TW); Hoa-Yu Chan, Taipei (TW); Chia-Jui Kuo, New Taipei (TW)

(73) Assignee: MSI COMPUTER (SHENZHEN) CO., LTD, Shenzhen, Guangdong Prov. (CN)

( * ) Notice: Subject to any disclaimer, the term of this patent is extended or adjusted under 35 U.S.C. 154(b) by 0 days. days.

(21) Appl. No.: 15/212,820

(22) Filed: Jul. 18, 2016

(65) Prior Publication Data
US 2017/0138729 A1    May 18, 2017

(30) Foreign Application Priority Data
Nov. 13, 2015    (CN) .......................... 2015 1 0772784

(51) Int. Cl.
*G01C 3/08*    (2006.01)
*G05D 1/02*    (2006.01)
*G05D 1/00*    (2006.01)

(52) U.S. Cl.
CPC ............. *G01C 3/08* (2013.01); *G05D 1/0088* (2013.01); *G05D 1/0212* (2013.01); *G05D 1/0238* (2013.01); *G05D 1/0242* (2013.01); *G05D 1/0274* (2013.01)

(58) Field of Classification Search
CPC ...... G01C 3/08; G05D 1/0212; G05D 1/0238; G05D 1/0242; G05D 1/0088; G05D 1/0274
USPC .......................................................... 701/23
See application file for complete search history.

(56) References Cited

U.S. PATENT DOCUMENTS

2014/0350839 A1* 11/2014 Pack ...................... G01C 21/30
                                                          701/409

* cited by examiner

*Primary Examiner* — Brian P Sweeney
(74) *Attorney, Agent, or Firm* — Birch, Stewart, Kolasch & Birch, LLP

(57) ABSTRACT

A movable device is provided. When the movable device is at a specific position, a range finder detects reflected light in a first field of view to generate first previous data. When the movable device returns to the vicinity of the specific position, the range finder detects reflected light in the first field of view to generate second previous data. The range finder detects reflected light in a second field of view to generate compensation data. The processor unit performs a SLAM operation on the first and second previous data to generate first and second previous maps, respectively. When a probability that the second previous map does not conform to the first previous map is greater than a threshold value, the processor unit performs the SLAM operation on specific data and the compensation data to control the moving path of the movable device.

18 Claims, 6 Drawing Sheets

MOVABLE DEVICES

CROSS REFERENCE TO RELATED APPLICATIONS

This Application claims priority of China Patent Application No. 201510772784.4, filed on Nov. 13, 2015, the entirety of which is incorporated by reference herein.

BACKGROUND OF THE INVENTION

Field of the Invention

The invention relates to a movable device, and, more particularly, to a movable device with a simultaneous localization and mapping (SLAM) algorithm.

Description of the Related Art

It is necessary for a movable device to move to preset locations automatically. For achieving this objective, the movable device should detect the condition of the peripheral environment to obtain the position for itself. Only after obtaining the position, the movable device can recognize which direction the target is in and the distance between itself and the target, and then the movable device moves toward the target. A conventional simultaneous localization and mapping (SLAM) algorithm is usually applied in movable devices.

While a movable device moves from a starting point, the movable device detects the condition of the peripheral environment and performs an operation on the detection result by using SLAM. When the movable device returns to the vicinity of the starting point, the movable device should obtain a profile map which is theoretically a closed curve. However, if there is an error in the detection operation of the movable device, the profile map is not a closed curve, which causes that the movable device cannot recognize the correct position itself.

BRIEF SUMMARY OF THE INVENTION

An exemplary embodiment of a movable device. The movable device comprises a driver unit, a range finder, and a processor unit. The driver unit drives the movable device according to a control signal to move in an area. At a first time point, the movable device is at a specific position in the area. At a second time point, the movable device returns to the vicinity of the specific position. The range finder detects reflected light in the area. At the first time point, the range finder detects reflected light in a first field of view to generate first previous data. At the second time point, the range finder detects reflected light in the first field of view to generate second previous data. The range finder detects reflected light in a second field of view to generate first compensation data. Boundaries of the first field of view do not overlap boundaries of the second field of view. The processor unit performs a simultaneous localization and mapping (SLAM) operation on the first previous data to generate a first previous map and a first previous position, performs the SLAM operation on the second previous data to generate a second previous map and a second previous position, and compares the first previous map with the second previous map to generate a comparison result. When the comparison result conforms to a pre-determined condition, the processor unit performs the SLAM operation on specific data and the first compensation data to generate a current map and generates the control signal according to the current map.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
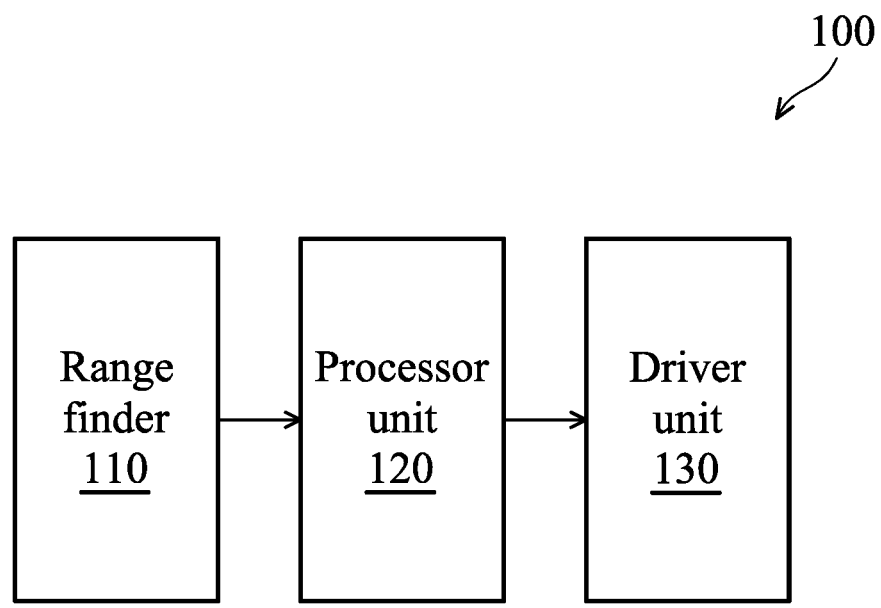
FIG. 1 is a schematic view showing an exemplary embodiment of an interior part of a movable device.

FIG. 1 is a schematic view showing an exemplary embodiment of an interior part of a movable device. As shown in FIG. 1, a movable device 100 comprises a range finder 110, a processor unit 120, and a driver unit 130. In the present invention, the type of the movable device 100 is not limited. In an embodiment, the movable device 100 can move in the air or on the ground. For example, the movable device 100 is a cleaning robot.

Figure 2A:
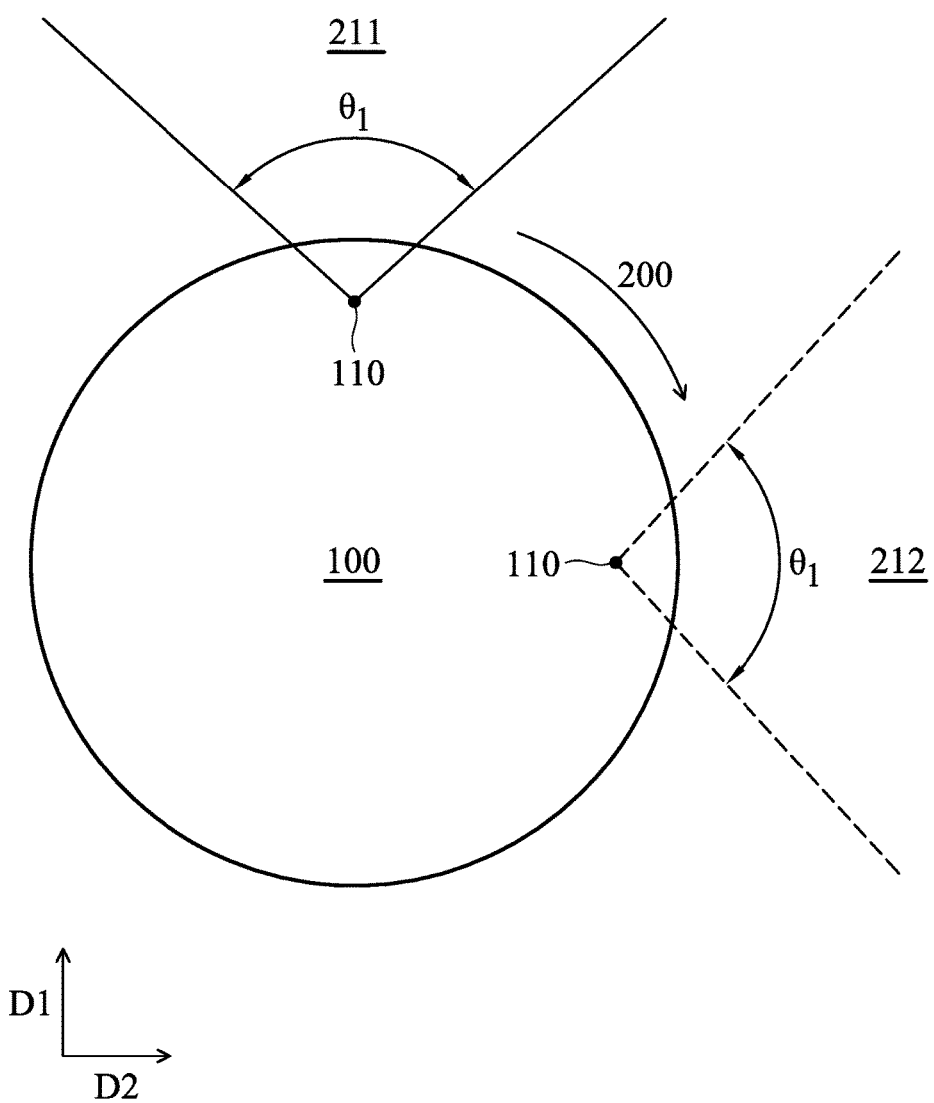
FIGS. 2A-2C are top views of the movable device of FIG. 1, which show exemplary embodiments of first and second fields of view.
Figure 2B:
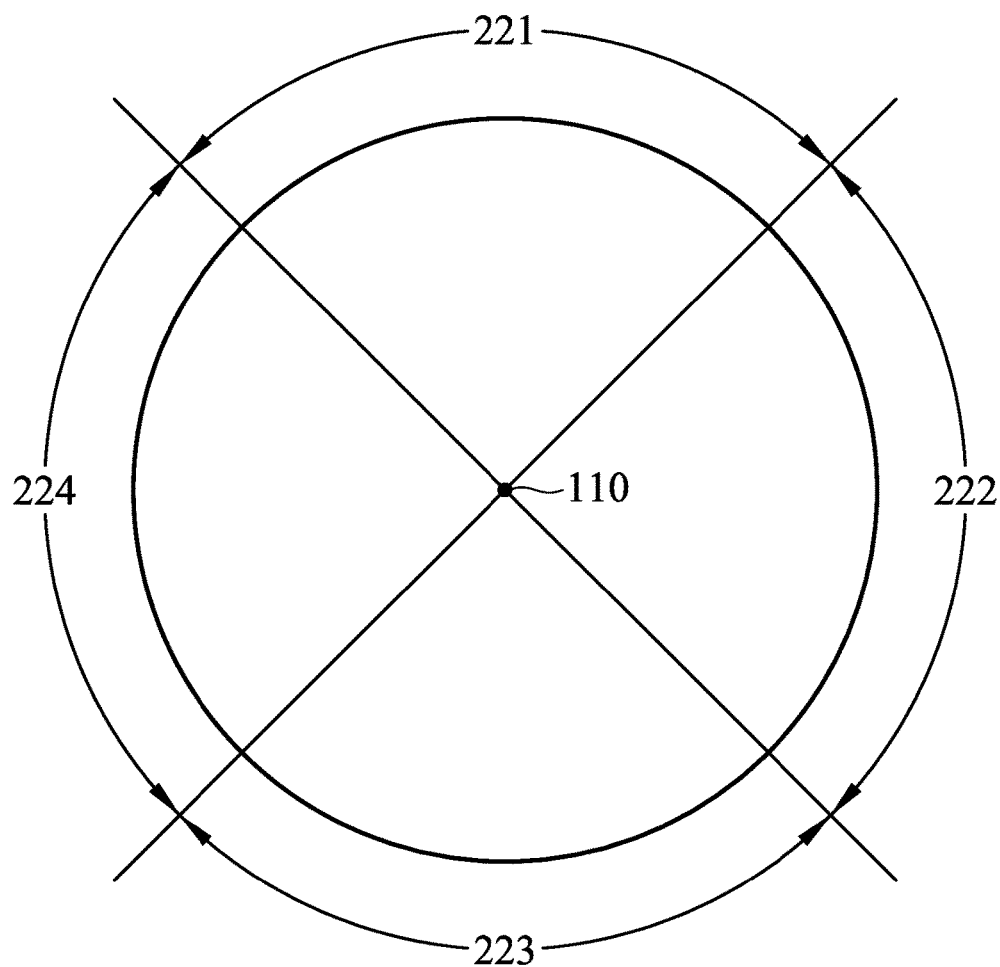
Figure 2C:
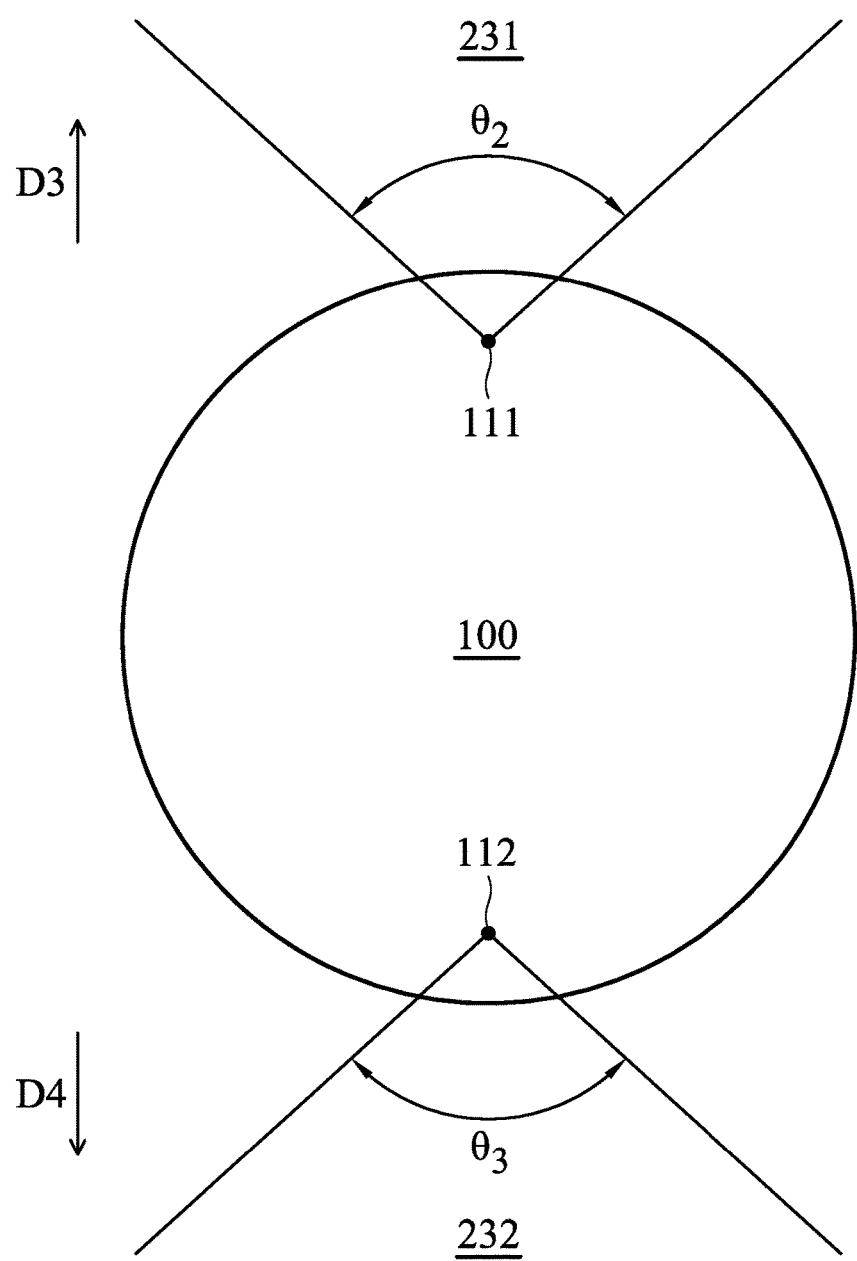

The range finder 110 detects reflected light in the area where the movable device 100 is located. FIGS. 2A-2C are top views of the movable device 100, which shows how the range finder 110 detects reflected light. In the embodiment, the range finder 110 is disposed on the top surface of the movable device 100, however, without limitation to the present invention. In an embodiment, the range finder 110 may be disposed on the side surface of the movable device 100.

In FIG. 2A, the range finder 110 has a viewing angle $\theta_1$. When the range finder 110 faces toward the direction D1, the range finder 110 can detect reflected light in a field of view 211 by adopting the viewing angle $\theta_1$. When the range finder 110 faces toward the direction D2, the range finder 110 can detect reflected light in a field of view 212 by adopting the viewing angle $\theta_1$. In the embodiment, the relative position of the range finder 110 to the movable device 100 is fixed. Through the rotation of the movable device 100, the range finder 110 can face in the direction D1 or D2.

In other embodiments, the position of the range finder 110 on the movable device 100 is adjustable. For example, the range finder 110 may be disposed on a rotatable mechanism platform (not shown). The rotatable mechanism platform rotates around a spinning shaft. When the rotatable mechanism platform rotates in the direction of the arrow 200, the range finder 110 faces toward the direction D2 from the direction D1 and detects reflected light which is vertical to the spinning shaft of the rotatable mechanism platform. In the embodiment, the field of view 211 does not overlap the field of view 212. In an embodiment, the total field range (that is 2 $\theta_1$) of the field of view 211 and the field of view 212 is greater than or equal to 120 degrees.

In FIG. 2B, the viewing angle of the range finder 110 is 360 degrees. In an embodiment, the range finder 110 comprises an omnidirectional camera which is used to detect 360-degree images, however, without limitation to the present invention. In another embodiment, the range finder 110 comprises a rotatable mechanism platform and an image sensor. In these cases, although the viewing angle of the image sensor is not 360 degrees, the image sensor can still detect 360-degree images when the rotatable mechanism platform is rotating.

In the embodiment, the 360-degree viewing angle of the range finder 110 is divided into sub-fields of view 211-224. The viewing angles of the sub-fields of view 211-224 are the same, that is, all of the viewing angles of the sub-fields of view 211-224 are equal to 90 degrees, however, without limitation to the present invention. In another embodiment, the viewing angle of one of the sub-fields of view is different the viewing angle of another of the sub-fields of view. As shown in FIG. 2B, the boundaries of each sub-field of view overlap the boundaries of the adjacent sub-fields of view. For example, the boundaries of the sub-field of view 221 overlap the boundaries of the adjacent sub-fields of view 222 and 224.

In FIG. 2C, the range finder 110 comprises image sensors 111 and 112. The image sensor 111 has a viewing angle $\theta_2$ and detects reflected light in a field of view 231 by adopting the viewing angle $\theta_2$. The image sensor 1121 has a viewing angle $\theta_3$ and detects reflected light in a field of view 232 by adopting the viewing angle $\theta_3$. The viewing angle $\theta_2$ may be greater than, equal to, or lower than the viewing angle $\theta_3$. In an embodiment, the sum of the viewing angles $\theta_2$ and $\theta_3$ is greater than or equal to 120 degrees. In another embodiment, one of the viewing angles $\theta_2$ and $\theta_3$ is two times of the other of the viewing angles $\theta_2$ and $\theta_3$. Moreover, the fields of view 231 and 232 are on the same horizontal plane.

In the present invention, the internal structure of the range finder 110 is not limited. In an embodiment, the range finder 110 comprises at least one image sensor. The image sensor detects reflected light from the environment to generate data. For example, at a first time point and a second time point, the image sensor detects reflected light in a first field of view to generate first previous data and second previous data. In an embodiment, at the first time point or the second time point, the image sensor detects reflected light in a second field of view to generate compensation data. In another embodiment, at a third time point, the image sensor detects reflected light in the first field of view to generate compensation data. The third time point may occur earlier or later than the first and second time points.

In the present invention, how to enable the image sensor to detect reflected light from different fields of view is not limited. In an embodiment, through the rotation of the movable device 100, the image sensor can face toward different directions to detect reflected light in different directions. In another embodiment, through a reflecting mirror or a rotatable mechanism platform, the image sensor can receive and detect reflected light in different fields of view. In some embodiments, reflected light in different directions can be detected by using at least two image sensors. In other embodiments, the range finder 110 further comprises an odometer or a inertial navigation system (INS) for measuring the moving distance or posture change of the movable device 100.

The range finder 110 may comprise at least one light emitter for emitting discontinuous light or linear correlation light. In the embodiment, the light emitted by the light emitter is invisible light. When an object is illuminated by invisible light, the object reflects the invisible light to generate reflected light. In another case, when an object is illuminated by visible light, the object also reflects the visible light to generate reflected light. In this case, the reflected light is referred to as ambient reflected light. In the present invention, the type of the reflected light received by the image sensor in the range finder 110 is not limited. In an embodiment, the reflected light detected by the image sensor excludes or only includes ambient reflected light. In another embodiment, the reflected light detected by the image sensor includes ambient reflected light. In other embodiments, when the range finder 110 comprises a plurality of image sensors, the reflected light detected by at least one of the image sensors excludes ambient reflected light.

In the present invention, the illumination range of the light emitted by the light emitter of the range finder 110 is not limited. In an embodiment, the range finder 110 only comprises a single light emitter which emits light in different directions simultaneously, such as the directions D3 and D4 shown in FIG. 2C. In another embodiment, the range finder 110 only comprises a single light emitter which emits light sequentially in the directions D3 and D4. In other embodiments, the range finder 110 comprises a plurality of light emitter to emit light in different directions.

Moreover, the light emitter of the range finder 10 may emit light continuously (linear correlation light) or emit light by a pulse pattern (discontinuous light source). For example, in a first period, the light emitter of the range finder 110 emits light, while in a second period, the light emitter stops emitting light. In a third period, the light emitter of the range finder 110 emits light again.

Figure 3A:
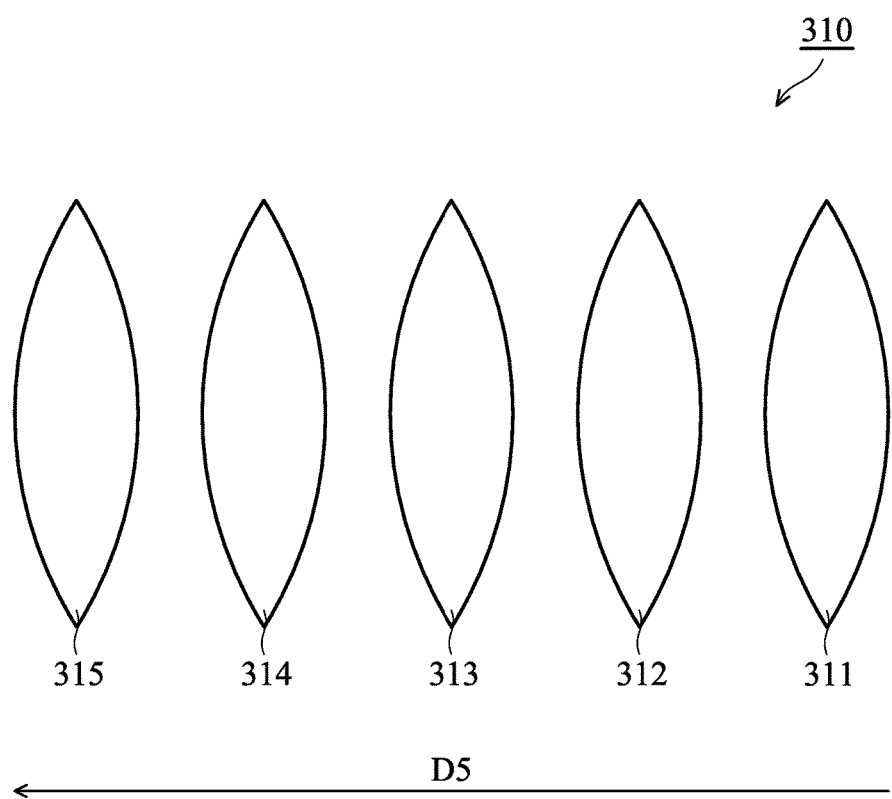
FIG. 3A is a schematic view showing an exemplary embodiment of piecewise continuous light.

In the present invention, the type of the light emitted by the light emitter of the range finder 110 is not limited. In an embodiment, the type of the light emitted by the light emitter of the range finder 110 is a piecewise continuous light. FIG. 3A is a schematic view showing an exemplary embodiment of piecewise continuous light. When the light emitter of the range finder 110 emits light 310 in the direction D5, the light 310 comprises light stripes 311-315. There is a dark stripe between every two adjacent light stripes. However, since the light seen by the human eyes is continuous light, the light 310 is referred to as piecewise continuous light.

Figure 3B:
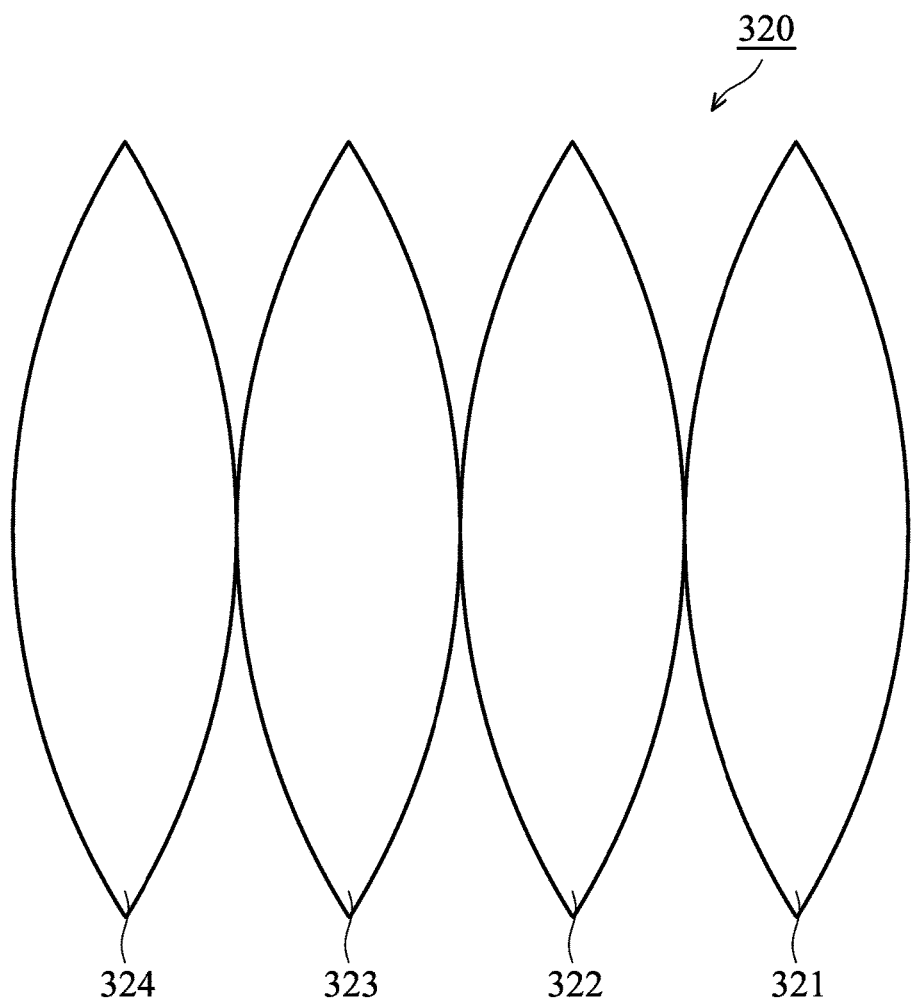
FIG. 3B is a schematic view showing an exemplary embodiment of linear correlation light.

In other embodiments, the width and length of the light stripes 311-315 are adjusted by controlling the energy of the light 310 or enable the light 310 to pass through a medium. In an embodiment, the medium is a lens, such as a wave lens, however, without limitation to the present invention. As shown in FIG. 3B, since the light 320 has enough energy, certain portions (such as the center portions) of two adjacent light stripes connect together. As shown in the figure, the light stripes 321-324 connect to each other. Thus, the light 320 is referred to as linear correlation light.

In an embodiment, when the range finder 110 only comprises a single light emitter, the light emitter may emit piecewise continuous light or linear correlation light according to a control signal (not shown). In another embodiment, when the range finder 110 comprises a plurality of light emitters, all of the light emitters may emit piecewise continuous light or linear correlation light, or at least one of the light emitters may emits piecewise continuous light and the others emits linear correlation light.

In other embodiments, the above light emitter(s) and image sensor(s) are integrated together. For example, the range finder 110 comprises at least one laser range finder. The laser range finder can not only emit laser but also detect reflected light. Thus, the laser range finder can replace the above light emitter(s) and image sensor(s).

Referring to FIG. 1 again, the processor unit 120 performs a simultaneous localization and mapping (SLAM) operation according to the detection result of the range finder 110 to generate map information and position information. In the embodiment, at a first time point, the movable device 100 moves to a specific position. At this time, the range finder 110 detects reflected light in the first field of view to generate first previous data. The processor unit 120 performs the SLAM operation on the first previous data to generate a first previous map and a first previous position. At a second time point, the movable device 100 returns to the vicinity of the specific position. At this time, the range finder 110 detects reflected light in the first field of view again to generate second previous data. The processor unit 120 performs the SLAM operation on the second previous data to generate a second previous map and a second previous position.

In an ideal case, when the movable device 100 returns to the vicinity of the specific position. The second previous map and the second previous position generated by the processor unit 120 conform to the first previous map and the first previous position respectively. However, in practice, the second previous map generated by the processor unit 120 may not conform to the first previous map or the second previous position generated by the processor unit 120 may not conform to the first previous position. Thus, in the embodiment, the processor unit 120 compares the first previous map and the second previous map to generate a comparison result. The processor unit 120 compares the comparison result and a pre-determined condition. When the comparison result conforms to the pre-determined condition, the processor unit 120 performs the SLAM operation on specific data and compensation data for controlling of moving path of the movable device 100. In one embodiment, the comparison result conforms to the pre-determined condition when a probability that the second previous map does not conform to the first previous map is greater than, is not greater than, or is equal to a threshold value. For brevity, assuming that the comparison result conforms to the pre-determined condition when the probability that the second previous map does not conform to the first previous map is greater than the threshold value.

In an embodiment, the specific data is the second previous data or the data which is generated by the range finder 110 when the range finder 110 detects reflected light in the first field of view at a third time point. In other embodiment, the compensation data is the data which is generated according to reflected light in another field of view. Taking FIG. 2A as an example, when the range finder 110 generates the first and second previous data according to the reflected light in the field of view 211, the compensation data is the data which is generated according to the reflected light in the field of view 212. In the embodiment, the range finder 110 generates the compensation data at the first, second, or third time point.

When the movable device 100 returns to the vicinity of the specific position, if the probability that the second previous map does not conform to the first previous map is lower than the threshold value and, however, the second previous position does not conform to the first previous position, the processor unit 120 still performs the SLAM operation on the specific data and the compensation data for updating the second previous position.

In an embodiment, if the probability that the second previous map does not conform to the first previous map is lower than the threshold value and the second previous position conforms with the first previous position, the processor unit 120 does not perform the SLAM operation on the specific data and the compensation data for updating the second previous position. According to the above embodiments, the processor unit 120 performs the SLAM operation on the specific data and the compensation data only when the probability that the second previous map does not conform to the first previous map is lower than the threshold value or the second previous position does not conform to the first previous position, however, without limitation to the present invention. In some embodiments, no matter whether the probability that the second previous map does not conform to the first previous map is greater than the threshold value or whether the second previous position conforms with the first previous position, the processor unit 120 always performs the SLAM operation on the specific data and the compensation data for generating a current map and a current position to replace the second previous map and the second previous position.

In an embodiment, only when the processor unit 120 requires the compensation data, the range finder 110 detects reflected light in the second field of view. In another embodiment, the range finder 110 detects reflected light in the second field of view continuously for generating the compensation data, and, however, the processor unit 120 does not perform the SLAM operation on the compensation data temporarily. In this case, the processor unit 120 stores the compensation data in a storage unit (not shown) first. When the processor unit 120 needs to use the compensation data, the processor unit 120 then retrieves the compensation data from the storage unit. In this case, the range finder 110 updates the compensation data stored in the storage unit continuously. In an embodiment, the range finder 110 transmits data to the processor unit 120 by using transmission lines or wireless connections (such as bluetooth).

In a corresponding field of view, the range finder 110 detects at least one beam of reflected light from the environment every one specific angle for providing at least one record of the depth information to the processor unit 120. According to the embodiment, in the case where the range finder 110 provides fixed records of the depth information to the processor unit 12, when the viewing angle (such as $\theta_1 \sim \theta_3$) is larger, the specific angle is larger. Taking FIG. 2C as an example, when the viewing angle $\theta_2$ is 120 degrees, the image sensor 111 detects one beam of reflected light from the environment every one degree for providing one record of depth information to the processor unit 120. Thus, the processor unit 120 can receive 120 records of the depth information. When the viewing angle $\theta_2$ is 150 degrees, the image sensor 111 detects one beam of reflected light from the environment every 1.5 degrees for providing one record of the depth information to the processor unit 120. When the viewing angle $\theta_2$ is 360 degrees, the image sensor 111 provides one record of the depth information to the processor unit 120 every 2.4 degrees.

In another embodiment, the image sensor 111 finder 110 can provide a plurality of records of the depth information to the processor unit 120 every one specific angle. Taking FIG. 2C as an example, it is assumed that the viewing angle $\theta_2$ is 120 degrees. In an embodiment, the image sensor 111 detects at least three beams of reflected light from the environment every one degree for providing at least three records of the depth information to the processor unit 120. When the viewing angle $\theta_2$ is 150 degrees, the image sensor 111 provides a plurality of records of the depth information to the processor unit 120 every 2.4 degrees.

In an embodiment, the processor unit 120 is independent to the movable device 100. According to this embodiment, the range finder 110 provides all data (including the first previous data, the second previous data, the specific data, and the compensation data) to an external device (not shown, such as a cloud system) through wired or wireless connections. The cloud system performs the SLAM operation and returns the operation result to the movable device 100. In this embodiment, the range finder 110 provides the compensation data to the external device continuously, and the external device performs the SLAM operation on the compensation data and returns the operation result to the movable device 100.

Referring to FIG. 1, the driver unit 130 works according to the map information and position information generated by the processor unit 120, for example for controlling a rotation speed or direction of a roller (not shown). In the embodiment, the processor unit 120 generates a control signal which is used to enable the driver unit 130 to drive the movable device 100 to move in an area. When the range finder 110 has a plurality of fields of view, the processor unit 120 determines whether the movable device 100 is at a 4-way intersection, a 3-way intersection, or an intersection of roads, and the driver unit 130 drives the movable device 100 to rotate at the determined position to obtain more records of map information. Moreover, when the movable device 100 is in a long corridor, the processor unit 120 enables the driver unit 130 to drive the movable device 100 to leave the long corridor by a head-in-tail-out manner (that is, the movable device 100 does not rotate). In another embodiment, if the long corridor which the movable device 100 is in is wide enough, the processor unit 120 enables the driver unit 130 to drive the movable device 100 to move along one wall or along a middle line between the two walls.

In another embodiment, when the processor unit 120 determines that the probability that the second previous map does not conform to the first previous map is greater than the threshold value or that the second previous position does not conform to the first previous position, the processor unit 120 generates a control signal (not shown) first. The control signal is provided to the driver unit 130 for controlling the behavior of the movable device 100, such as decreasing the movement speed of the movable device 100, driving the movable device 100 to rotate in the inverse direction, or driving the movable device 100 to move along one wall. While the movable device 100 is moving, the range finder 110 provides new detection data to the processor unit 120, such that the processor unit 120 can continuously determine whether the probability that the second previous map does not conform to the first previous map is greater than the threshold value or whether the second previous position does not conform to the first previous position. When the probability that the second previous map does not conform to the first previous map is greater than the threshold for a time period (such as 5 seconds), the processor unit 120 then performs the SLAM operation on the specific data and the compensation data to update the previous map and/or the previous position. In an embodiment, the processor unit 120 may remove the previous map and then build a new map, or the processor unit 120 may just reset a portion of the previous map.

Moreover, in the embodiment, the range finder 110 can generate invisible light. When an object is illuminated by invisible light, the light reflected from the object is referred to as non-ambient reflected light. When an object is illuminated by visible light (such as the light from the sun or fluorescent lamps), the light reflected from the object is referred to as ambient reflected light. The processor unit 120 adjusts the emitting power or exposure degree of the range finder 110 according to the difference between the non-ambient reflected light and the ambient reflected light.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling a cleaning robot, the cleaning robot including a processor configured to control the cleaning robot, the method comprising:
   driving the cleaning robot to move in an area, wherein at a first time point, the cleaning robot is at a specific position in the area, and at a second time point, the cleaning robot returns to the vicinity of the specific position;
   at the first time point, detecting reflected light in a first field of view to generate first previous data;
   at the second time point, detecting reflected light in the first field of view to generate second previous data;
   detecting reflected light in a second field of view to generate first compensation data, wherein boundaries of the first field of view do not overlap boundaries of the second field of view;
   performing a simultaneous localization and mapping (SLAM) operation on the first previous data to generate a first previous map and a first previous position;
   performing the SLAM operation on the second previous data to generate a second previous map and a second previous position; and
   comparing the first previous map with the second previous map to generate a comparison result,
   wherein when the comparison result conforms to a pre-determined condition, the SLAM operation is performed on specific data and the first compensation data to generate a current map and the cleaning robot is driven according to the current map.

2. The method as claimed in claim 1, wherein when a probability that the second previous map does not conform to the first previous map is greater than a threshold value, the comparison result conforms to the pre-determined condition, and when the probability that the second previous map does not conform to the first previous map is not greater than the threshold value, the first compensation data is not adopted.

3. The method as claimed in claim 1, wherein the specific data is the second previous data.

4. The method as claimed in claim 1, further comprising:
   at a third time point, detecting reflected light in the first field of view to generate the specific data.

5. The method as claimed in claim 4, wherein at the first, second, or third time point, reflected light in the second field of view is detected to generate the first compensation data.

6. The method as claimed in claim 1, further comprising:
generating discontinuous light or linear correlation light, wherein reflected light is generated when an object is illuminated by the discontinuous light or linear correlation light;
detecting reflected light in the first field of view to generate the first previous data, the second previous data, and the specific data; and
detecting reflected light in the second field of view to generate the first compensation data.

7. The method as claimed in claim 1, further comprising:
utilizing a rotatable mechanism platform being capable of rotating around a spinning shaft; and
utilizing an image sensor, disposed on the rotatable mechanism platform, to detect reflected light which is vertical to the spinning shaft.

8. The method as claimed in claim 1, wherein a range finder is utilized to detect reflected light in the first field of view by adopting a first viewing angle and detect reflected light in the second field of view by adopting a second viewing angle, and a sum of the first viewing angle and the second viewing angle is greater than or equal to 120 degrees.

9. The method as claimed in claim 8, wherein the range finder comprises:
a first laser range finder emitting first laser toward the first field of view and detecting reflected light in the first field of view to generate the first previous data, the second previous data, and the specific data; and
a second laser range finder emitting second laser toward the second field of view and detecting reflected light in the second field of view to generate the compensation data.

10. The method as claimed in claim 9, wherein the area comprises at least one object,
wherein first reflected light is generated from the object when the object is illuminated by the first laser, and second reflected light is generated from the object when the object is illuminated by the second laser,
wherein ambient reflected light is generated from the object when the object is illuminated by a light source, and
wherein emitting power or exposure degree of the first and second laser range finders are adjusted according to the difference between the first and second reflected light and the ambient reflected light.

11. The method as claimed in claim 9, wherein when the cleaning robot moves in a first direction, the first laser range finder emits the first laser toward the first direction and emits the second laser toward a second direction which is different from or inverse to the first direction.

12. The method as claimed in claim 1, wherein a range finder is utilized to emit light in a first period, the range finder stops emitting light in a second period, and the range finder emits light in a third period.

13. The method as claimed in claim 1, wherein a range finder is utilized to detect a plurality of beams of reflected light in the first field of view every one specific angle to provide at least one record of depth information to the processor unit.

14. The method as claimed in claim 13, wherein the range finder provides at least three records of the depth information to a processor unit.

15. The method as claimed in claim 13, wherein when the first field of view is 120 degrees, the specific angle is one degree,
wherein when the first field of view is 150 degrees, the specific angle is 1.3 degrees, and
wherein when the first field of view is 360 degrees, the specific angle is 2.4 degrees.

16. The method as claimed in claim 1,
wherein a storage unit is utilized to store the first compensation data,
wherein when the second previous position does not conform to the first previous position, the SLAM operation is performed on the first compensation data stored in the storage unit and the specific data.

17. The method as claimed in claim 1, wherein at the first time point, reflected light in the second field of view is detected to generate second compensation data and the SLAM operation is performed on the first previous data and the second compensation data to drive the cleaning robot.

18. The method as claimed in claim 17, wherein at the second time point, reflected light in the second field of view is detected to generate third compensation data and the SLAM operation is performed on the second previous data and the third compensation data to drive the cleaning robot.

* * * * *